United States Patent [19]

Yoshiwara et al.

[11] Patent Number: 4,638,939
[45] Date of Patent: Jan. 27, 1987

[54] METHOD FOR PRODUCING A CLAD PLATE BY ROLLING

[75] Inventors: Seishiro Yoshiwara; Takao Kawanami, both of Kitakyushu, Japan

[73] Assignee: Nippon Steel Corporation, Tokyo, Japan

[21] Appl. No.: 616,168

[22] Filed: Jun. 1, 1984

[30] Foreign Application Priority Data

Jun. 4, 1983 [JP] Japan .................................. 58-99988
Jun. 25, 1983 [JP] Japan ................................ 58-113624
Jun. 25, 1983 [JP] Japan ................................ 58-113625

[51] Int. Cl.⁴ ........................................... B23K 31/02
[52] U.S. Cl. ................................. 228/186; 228/235; 228/243
[58] Field of Search ............... 228/17, 235, 243, 170, 228/186; 72/240

[56] References Cited

U.S. PATENT DOCUMENTS 3,200,491 8/1965 Walker et al. ....................... 228/235
3,258,839 7/1966 Resnick ................................ 228/117
3,470,607 10/1969 Rader et al. ......................... 228/117
4,133,166 9/1978 Olsson .................................. 228/176

Primary Examiner—Robert P. Olszewski
Assistant Examiner—Maurina Rachuba
Attorney, Agent, or Firm—Kenyon & Kenyon

[57] ABSTRACT

A method for producing a clad plate by rolling a cladding assembly formed of a cladding material and a base material to bond the cladding material with the base material. The bonding is effected by main rolling initiated at an essentially central portion of a predetermined bonding surface of the cladding assembly and is advanced toward one of the ends of the cladding assembly.

6 Claims, 10 Drawing Figures

METHOD FOR PRODUCING A CLAD PLATE BY ROLLING

BACKGROUND OF THE INVENTION

1. Field of the Invention

The present invention relates to a method for producing a clad plate, more particularly a metal-clad plate, such as a titanium- or stainless-steel-clad plate, by means of rolling. The present invention is particularly characterized by the bonding in the rolling method for producing the metal-clad plate and by the process for assembly of a blank of a metal-clad plate.

2. Description of the Prior Art

It is difficult to produce titanium-clad plates and other metal-clad plates by means of rolling. Therefore, metal-clad plates are mainly produced by the explosive welding method. The explosive welding method, however, has numerous inherent limitations, such as the inability to process large-sized workpieces and the limited quality of the product.

It is known from Japanese Unexamined patent publication (Kokai) No. 52-13460 to apply copper plating to at least one of the surfaces of cladding titanium and a steel base, evacuate all gas from the space between the cladding titanium and steel base, then roll the cladding titanium and steel base. Assuming the workpiece to be rolled is subjected to a constant rolling force from one end to the other, this method of rolling may be classified as a conventional hot-rolling method.

When a conventional hot-rolling method is employed for producing clad plates, the cladding assembly sometimes breaks during the rolling, not only scattering fragments and bending and abnormally deforming the workpiece, but also, especially in the case of a titanium-clad plate, allowing oxidation of the predetermined bonding surfaces and intrusion of foreign matter onto the predetermined bonding surface, thereby reducing the field of the clad plate.

In a cladding assembly disclosed in Japanese Unexamined Patent Publication No. 52-13460, a cladding titanium sheet is welded to a steel base via distant pieces. This structure, however, is not completely satisfactory for preventing the reduction in yield during the hot-rolling.

On another matter, when a clad plate is produced by a conventional rolling method, the material having the lower deformation resistance is forced to flow toward the rear end as seen in the rolling direction. This causes significant deviation of the clad ratio, i.e., the ratio of thickness of cladding metal to the thickness of the base, from the target value and variation of the same in the rolling direction. It also results in a large cropping amount at the ends of the clad plate. These problems are particularly serious when titanium-clad plates are produced by rolling with a high reduction ratio. In addition, these problems are not eliminated by the methods of the above described Japanese unexamined patent publications.

SUMMARY OF THE INVENTION

It is an object of the present invention to provide a method for producing a clad plate, in which materials having different deformation resistances, such as titanium and steel, are bonded by rolling, the bonding has high reliability, and the thickness accuracy of the bonded sheets is high.

It is a specific object of the present invention to reduce the percent of unbonded surface area, i.e., the percent of the unbonded surface area to the inspected surface area of a clad plate, to reduce variation in the clad ratio, and/or reduce the cropping amount of the ends of a clad plate.

The fundamental technique of the present invention is characterized by, during the bonding of a cladding assembly by means of rolling, initiating the bonding at an essentially central portion of a predetermined bonding surface of the cladding assembly and advancing the bonding toward an end of the cladding assembly.

Here, "cladding assembly" means an assembly of a base material superimposed on a cladding material, together with, if necessary, a false material. The cladding material may be, for example, titanium or stainless steel, while the base material may be steel. The following description is made in reference to a titanium cladding material and a steel base material, but the invention is not limited thereto.

The principal aims of the above-mentioned type of rolling are, by imparting a greater rolling force on essentially the central portion of the cladding assembly than the front end portions and advancing the bonding from the central portion, to minimize the slip between the base material and the cladding material and squeeze out gas from the essentially central portion to end portions of the cladding assembly. This rolling is hereinafter referred to as the "main rolling".

The "essentially central portion" (hereinafter referred to merely as the "central portion") of the cladding assembly, i.e., the intermediate portion between the ends of the cladding assembly where the rolling can be initiated, is a highly important concept in the attainment of the above principal aims.

BRIEF DESCRIPTION OF THE DRAWINGS

Embodiments of the present invention will now be described in detail with reference to the accompanying drawings, in which.

DESCRIPTION OF THE PREFERRED EMBODIMENTS

The deformation resistances of the cladding and base materials which constitute a clad plate are inevitably different from one another due to difference in the materials. The reduction ratio of the material having the smaller deformation resistance is larger than that of the other material. This larger reduction ratio is further increased when there is only a small restraining force applied to the unrolled portion of the workpiece. As a result, a large amount of material is forced to flow back in the rolling direction. If the two sheets of cladding material and base material having the different deformation resistances are not restrained at the rear ends thereof as seen in the rolling direction, the sheet having the lower deformation resistance is elongated greatly. On the other hand, if the two sheets are restrained at the rear ends, the sheet having the lower deformation resistance becomes increasingly thicker at the portion nearer to the rear end as a result of conventional rolling. This elongation and thickness variation can be prevented by the main rolling, which minimizes the slip between the sheets.

In accordance with the present invention, the main rolling is first carried out in one direction from the central portion of the cladding assembly and, subsequently, carried out in the other direction. The second main rolling achieves the same effects as the first main rolling and provides the conditions for satisfactory subsequent rolling for the purpose of thickness reduction, etc., free from cladding assembly by trouble such as breakage which accompanies bending, abnormal deformation of the clad plate, and oxidation contamination of and intrusion of foreign matter into the predetermined bonding surfaces.

In accordance with one method of the present invention, the roll distance is gradually increased during the main rolling, thereby attaining the effect by the bonding which is advanced from the central portion prior to the end portions and the effect of lessening the amount of cropping at the ends of the as-rolled clad plate.

In accordance with another method of the present invention, grooves at least 0.10 mm in depth and extending in a direction across the rolling direction are formed on one or both of the surfaces of the cladding assembly to be bonded, local pressure-forming the surfaces of the cladding assembly is carried out, and, subsequently, the main rolling is initiated at the central portion and is advanced toward an end of the cladding assembly with a first rolling pass of from 2% to 20%. This is effective for lessening the unbonding surface ratio, variation in the clad ratio, and the amount of cropping at the ends of the clad plate.

The cladding assembly manufactured by the method of the present invention not only is less susceptible to breakage but also has enhanced bonding reliability.

Figure 1:
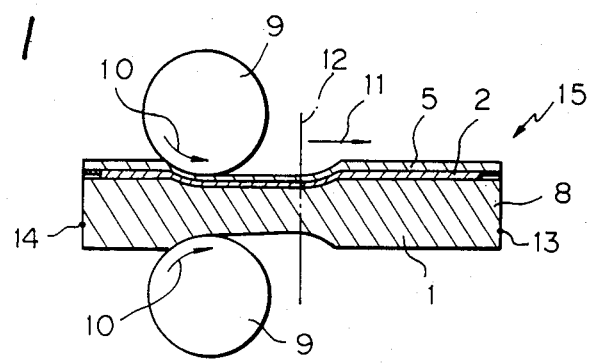
FIG. 1 illustrates the process of main rolling in accordance with the present invention.

Referring to FIG. 1, in which the procedure of the main rolling according to the present invention is illustrated, a steel base 1, cladding titanium 2, and a false material 5 made of steel are superimposed to form a cladding assembly 15. The cladding assembly 15 is forwarded by a table roller (not shown) or rolling rolls 9 in a direction from a front end 13 to a rear end 14. The principal objects of this forwarding procedure are to convey the cladding assembly 15, and to set the roll distance for enabling, at a central portion 12 for the main rolling with a predetemined reduction ratio. The forwarding procedure is referred to as "preliminary rolling". Subsequently, the main rolling is carried out while the portion of the cladding assembly 15 from the central portion 12 to the rear end 14 passes between the rolling rolls 9 rotating in a direction 10.

Figure 2A:
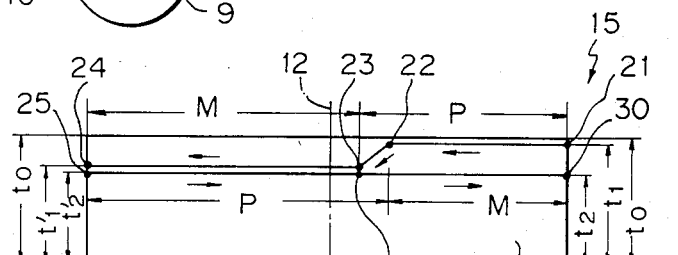
FIGS. 2A and 2B schematically illustrate the relationship between the thickness of a workpiece and the rolling direction in accordance with the present invention.

In FIG. 2A, the relationship between the thickness of the workpiece and the rolling direction according to one method of the invention is schematically illustrated. The cladding assembly 15 has an original thickness $t_0$. After being subjected to the preliminary rolling from the right end as seen in the drawing, it obtains a thickness $t_1$. The roll distance is decreased to reduce the thickness when the rolling rolls (not shown) arrive at a portion between the points 22 and 23, located before the central portion 12 of the cladding assembly 15. The first preliminary rolling is thus completed. The first main rolling is initiated at the point 23 and is continued until reaching the left end as seen in the drawing, thereby obtaining a thickness $t'_1$. Next, a second preliminary rolling is initiated in a direction opposite to the first main rolling at the left end and a second main rolling initiated at the point 23'. The second main rolling is completed at the right end as seen in the drawing, thereby obtaining a thickness $t_2$. The portions of the cladding assembly 15 subjected to preliminary rolling and main rolling are denoted by P and M, respectively. Rolling force is not necessarily indispensable between the points 21 and 22, i.e., the portion P subjected to the first preliminary rolling.

Figure 2B:
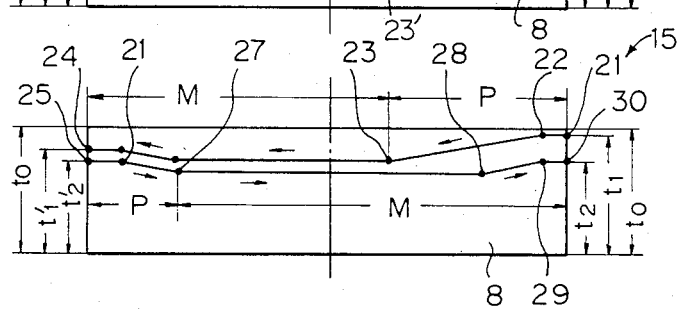

Referring to FIG. 2B, showing the relation between thickness of the workpiece and the rolling direction according to another method of the present invention, the rolling distance is more frequently changed than in the case of FIG. 2A. In FIG. 2B, M and P also denote the main rolling and preliminary rolling, respectively. The front and rear end portions of the cladding assembly 15, which is also subjected to two rolling passes, are thicker than the other portions. This prevents breakage of the cladding assembly 15 liable to occur during rolling at the front and rear ends. After the two passes, another pass is made on the cladding assembly 15, preferably in a traverse direction rather than the longitudinal direction of the previous rolling passes. In this case, the cladding assembly 15 is strongly restrained at the lateral ends thereof during the rolling by the rolls. Therefore, breakage of the cladding assembly 15 rarely occurs. On the other hand, the cladding assembly 15 with the thickness distribution shown in FIG. 2B may be subjected to rolling in a direction perpendicular to the longitudinal direction, thereby reducing unevenness at the ends of the clad plate and, hence, shortening the cropping length.

In accordance with the present invention, instead of changing the roll distance, it is also possible to simultaneously roll a wedge-shaped plate, having a higher deformation resistance than the cladding assembly, with the cladding assembly. This rolling can attain effects equivalent to those attained by rolling with varied roll distance.

Figure 3A:
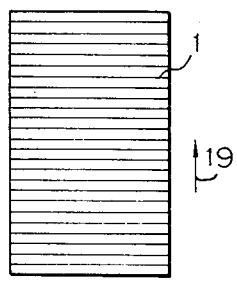
FIGS. 3 A, B, C show examples of grooves formed on a predetermined bonding surface of workpieces in accordance with the present invention.
Figure 3B:
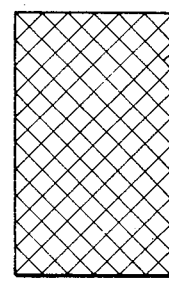
Figure 3C:
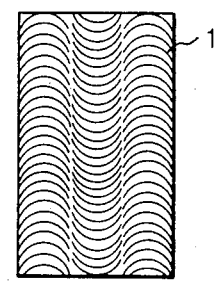

In accordance with the present invention, in preparation for the main rolling for bonding the two sheets, grooves may be formed on a surface of the base material and cladding material (FIG. 3) and the two sheets preliminarily rolled, preferably at a reduction ratio of from 2 to 20%, to locally bond them and thus to decrease the slip therebetween. In this case, improved results over those of a base material without the grooves are obtained. More specifically, grooves extending in a direction intersecting the rolling direction are formed on at least one of the surfaces to be bonded of the base material 1 and the cladding material (not shown). The grooves can be formed by means of a shaper, a milling cutter, a knurling tool, or the like. A groove depth of 0.10 mm or more is effective for stopping the slip. The depth of the grooves, however, may not exceed half the thickness of the cladding material. In order to provide closely engaged pressure-adhered surfaces, the grooves preferably have sharp convexities and concavities and are preferably close.

For the preliminary forming, a rolling method with a light rolling force, a method of decreasing the roll distance during the rolling or intermittent rolling-interruption, a method of vibrating the rolls, a method of local pressure deformation by using rolls having projections, or a method for rolling, together with the cladding assembly, a plate, bar, or lattice having a higher deformation resistance than the assembly is recommendable. The recommended highest local reduction of thickness of the preliminary rolling is 10% so as not to leave flaws in the final clad product.

Figure 4A:
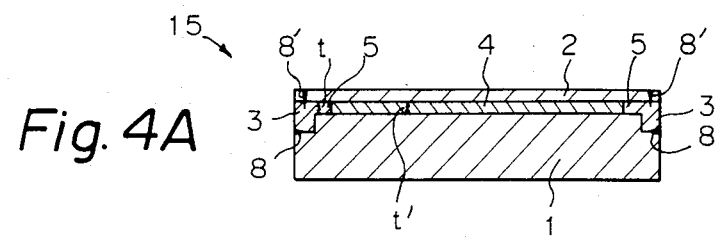
FIGS. 4A through 4D shows examples of workpiece assemblies for producing a metal-clad plate in accordance with the present invention.
Figure 4B:
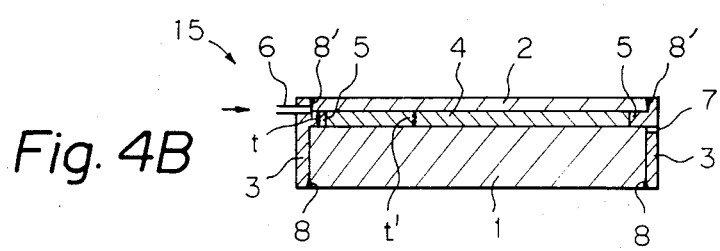
Figure 4C:
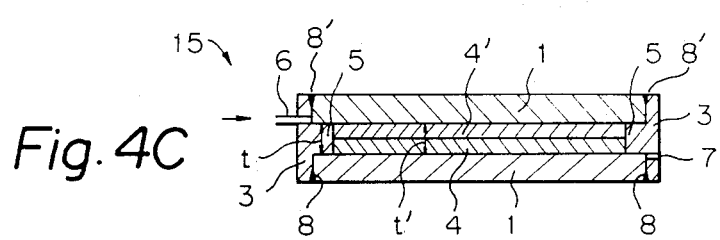
Figure 4D:
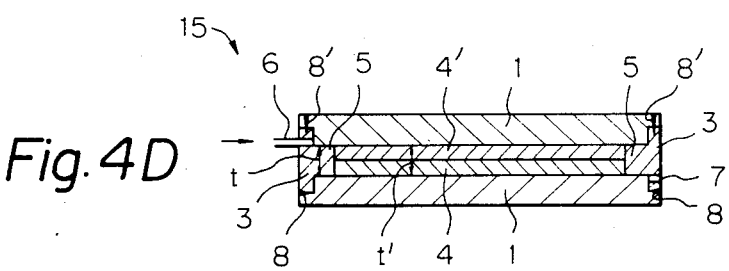

Referring to FIGS. 4A through 4D, preferable cladding assemblies are illustrated. The cladding assemblies 15 consist of top and bottom sheets, i.e., two sheets of the base material 1 (FIGS. 4C, 4D) or one sheet of the base material 1 and one sheet of a false material 2 (FIGS. 4A, 4D); side frames 3; and one or two sheets of cladding material 4, 4' surrounded by the top and bottom sheets and side frames 3. The side frames 3 shown have projections 5 of a thickness (t) equal to the thickness of the cladding material 4 or the total thickness (t') of the cladding materials 4, 4'. In assembly, first, the projections 5 are clamped between the top and bottom sheets, i.e., between the two sheets of base materials 1, 1 (FIGS. 4C, 4D) or between one sheet of base material 1 and one sheet of false material 2 (FIGS. 4A, 4B). One of the top and bottom sheets is then secured to the side frames 3 by welds 8. The nonsecured sheet of the top and bottom sheets is then bonded with the side frames 3 by welds 8, 8', thereby completing the cladding assembly 15.

Since the side frames 3 are clamped by the rolling force during the rolling of the cladding assembly 15, they can resist the outward pushing force of the cladding material 4. Breakage of the side frames 3 can therefore be prevented. Side frames entirely clamped between the top and bottom sheets (FIG. 4D) are particularly resistant to the outward pushing force of the cladding material 4, 4'.

The projections 5 of the side frames 3 are also effective for hindering deposition of welding sputter or fumes on the bonding surfaces. Nevertheless, from an industrial viewpoint, it is important to additionally carry out, during the assembly of the members of the cladding assembly 5, an additional step of cleaning the bonding surfaces to remove contaminants, such as oil and welding sputter or fumes, by means of brushing, wiping with a solvent, e.g., acetone, or sandpapering. Even so, the cleaned predetermined bonding surface may later be contaminated by the sputter or fumes during subsequent welding. To prevent such contamination, inert gas such as argon, helium, or nitrogen is advantageously blown through a blowing port 6 to the interior of the cladding assembly 15 until a positive pressure is established in the interior. The remaining welds 8, 8', preferably laser-beam welds, are then made under the positive pressure. Reference numerals 8' in FIGS. 4A and 4D denote welds of the cladding assembly 15 which are preferably laser-beam welds. The blowing port 6 may be formed through the side frames 3.

When laser-beam welding and positive inner pressure are utilized for forming the remaining welds 8', it is possible to keep the sputter or fumes out of the cladding assembly 15. At the same time, the heat input is low due to the laser-beam welding, hence suppressing temperature elevation and preventing oxidation of circumferential parts.

After forming the remaining welds 8, 8', the blowing port 6 may be closed. In this case, the inert gas is sealed within the cladding assembly. The sealed inert gas can prevent excessive oxidation of the bonding surfaces during heating for rolling. However, the pressure of the sealed inert gas increases due to the heating and concentrates at the rear end of the cladding assembly 15 during the rolling. To prevent breakage of the rear end, a small port 7 is desirably formed through the side frames 3, communicated with an end of the base material 1, and filled with metal (not shown) having a lower melting point than the temperature of the heating step subsequent to assembly. In the next heating step, the gases remaining in the cladding assembly 15, and any gas emitted from the metal due to the heat, can escape through the small port 7. When the main rolling is carried out so that the small port 7 is positioned at the rear end as seen in the rolling direction, the above-mentioned gases are squeezed out through the small port 7 for removal even during the main rolling, which further enhances the reliability of the bond.

The present invention will now be further explained with reference to examples, which by no means limited the invention.

Table 1 gives details of the examples. Example No. 1 is a comparative example based on a conventional method using alternate rolling with four passes.

Examples Nos. 2 and 3 are examples of the present invention. In Examples 2 and 3, when the control portion of the cladding assembly was compressed by the rolls 9 (FIG. 1), the roll distance was not decreased but a cold steel wedge was inserted between one of the rolls and the cladding assembly. The steel wedge used in Example No. 2 had a rectangular cross-section 50 mm×50 mm in size. The steel wedge used in Example No. 3 had a tapered cross-section 50 mm in length and a height varying from 50 mm to 0.5 mm. The width of the steel wedges was the same as that of the central portion of the cladding assembly. The steel wedge was off-set from the central portion of the cladding assembly such that its lesser thickness was directed toward the rear end of the cladding assembly.

Example No. 4 is another example of the present invention. This example is illustrated in FIG. 2B. In the first pass, rolling from the right to left of the drawing was carried out. During the preliminary rolling (P), the roll distance was initially 27.0 mm and then reduced down to 23.5 mm. At point 23 in FIG. 2B, main rolling (M) was initiated with the 23.5 mm roll distance, and later changed to 25.0 mm. In the second pass, rolling in a direction opposite to the first pass was carried out. The roll distance at the preliminary rolling (P) was decreased from 24.0 mm to 19.0 mm. The roll distance was maintained to 19.0 mm and later increased to 24.0 mm during the main rolling (M). In the third pass, the workpiece was turned 90° to make the rolling direction perpendicular to the rolling directions of the previous two passes. The roll distance was 14.5 mm over the entire length of the workpiece. In the fourth pass, rolling in a direction opposite to that of the third pass was carried out, while maintaining the roll distance of 11.0 mm over the entire length of the workpiece.

TABLE 1

|  | Conventional | Invention | | |
| --- | --- | --- | --- | --- |
|  | Test No. 1 | Test No. 2 | Test No. 3 | Test No. 4 |
| Structure of Clad-assembling Body | FIG. 4B | FIG. 4B | FIG. 4B | FIG. 4B |

TABLE 1-continued

|  |  | Conventional | Invention | | |
|---|---|---|---|---|---|
|  |  | Test No. 1 | Test No. 2 | Test No. 3 | Test No. 4 |
| Thickness of Cladding Titanium | (mm) | 4.5 | 4.5 | 4.5 | 4.5 |
| Thickness of (steel) Base | (mm) | 20 | 20 | 20 | 20 |
| Thickness of False Material (steel) | (mm) | 4.0 | 4.0 | 4.0 | 4.0 |
| Dimension of Assembled Body | (mm) | 28.5 t × 110 w × 210 l | 28.5 t × 110 w × 210 l | 28.5 t × 110 w × 210 l | 28.5 t × 110 w × 210 l |
| Heating Temperature | (°C.) | 750 | 750 | 750 | 750 |
| Direction of First Rolling Pass |  | Longitudinal-direction (forward) | Lateral-direction (forward) | Lateral-direction (forward) | Lateral-direction (forward) |
| Roll Distance | (mm) | 23.5 | 28.5 | 28.5 | P: 27.0 → 23.5 M: 23.5 → 25.0 |
| Dimension of Wedge |  | — | 5.0 t × 50 w × 250 | 5.0~0.5 t × 50 w × 250 | — |
| The Greatest Reduction in Thickness | (%) | 17.5 | 17.5 | 17.5 | M: 17.5 |
| Direction of Second Rolling Pass |  | Longitudinal-Direction (reverse) | Lateral-direction (reverse) | Lateral-direction (reverse) | Lateral-direction (reverse) |
| Roll Distance | (mm) | 19.0 | 28.5 | 28.5 | P: 24.0 → 19.0 M: 19.0 → 24.0 |
| Dimension of Wedge |  | — | 5.0 t × 50 w × 250 | 5.0~0.5 t × 50 w × 250 | — |
| The Greatest Rolling Force | (%) | 19.2 | 17.5 | 17.5 | M: 19.2 |
| Direction of Third Rolling Pass |  | Longitudinal-direction (forward) | Longitudinal-direction (forward) | Longitudinal-direction (forward) | Longitudinal-direction (forward) |
| Roll Distance | (mm) | 14.5 | 16.0 | 16.0 | 14.5 |
| Rolling Force at Central Portion | (%) | 23.7 | 31.9 | 31.9 | 23.7 |
| Direction of Fourth Rolling Pass |  | Longitudinal-direction (reverse) | Longitudinal-direction (reverse) | Longitudinal-direction (reverse) | Longitudinal-direction (reverse) |
| Roll Distance | (mm) | 11.0 | 11.0 | 11.0 | 11.0 |
| Reduction in Thickness at Central Portion | (%) | 24.1 | 31.3 | 31.3 | 24.1 |
| Length of Crop End at Front End | (mm) | 22 | 18 | 14 | 11 |
| Length of Crop End at Back End | (mm) | 34 | 25 | 21 | 16 |
| Unbonded Surface Area Ratio | (%) | 18 | 2 or less | 2 or less | 2 or less |
| Clad Ratio | (maximum value) | 0.24 | 0.23 | 0.23 | 0.22 |
| Clad Ratio | (minimum value) | 0.16 | 0.18 | 0.18 | 0.19 |
| Clad Ratio | (range) | 0.08 | 0.05 | 0.05 | 0.03 |

In the table, "crop length" means the length of the end portion of the rolled products which is scrapped due to poor shape, dimensions, and flaws.

From a comparison of Example No. 4 with Example No. 1, it is readily apparent that the present invention is superior to the conventional method in the length of the crop end at the front end: 11 mm vs 22 mm; the length of the crop end at the rear end: 16 mm vs 34 mm; the unbonded surface area ratio: 2% or less vs 18%; the maximum clad ratio: 0.22 vs 0.24; the minimum clad ratio: 0.19 vs 0.16; and the range of clad ratio: 0.03 vs 0.08.

In Example Nos. 2 and 3, results similar to Example No. 4 were achieved.

In Example No. 1, the end portions of the cladding assembly were broken and the cladding titanium was squeezed out during the rolling, which caused failure in the end shape of the clad plate. Due to the breakage of the end portions of the cladding assembly, the predetermined bonding surfaces were oxidized, which increased the unbonded surface area ratio. During the rolling of the cladding assembly in Example Nos. 2 through 4, no breakage of the cladding assembly occurred.

We claim:

1. A method for producing a clad plate by means of hot rolling a cladding assembly having a first welded end and a second welded end and comprising a cladding material and a base material to bond the cladding material with the base material, characterized in that said bonding is effected by main rolling by at least two driven rolls spaced apart at a selected distance, which main rolling is initiated at an essentially central portion of a predetermined bonding surface of the cladding assembly and is advanced toward the first end of the cladding assembly.

2. A method according to claim 1, characterized in that, subsequent to the main rolling from the essentially central portion to the first end, the main rolling is carried out from the essentially central portion to the second end.

3. A method according to claim 1, characterized in that the selected distance between rolls is increased during the main rolling in a direction from the essentially central portion to one of the ends of the cladding assembly.

4. A method according to claim 1, 2, or 3, characterized in that grooves at least 0.10 mm in depth are formed on the predetermined bonding surface of the cladding assembly, said grooves extending in a direction across a rolling direction, the cladding assembly is then locally adhesion-bonded, and then the main rolling is initiated.

5. A method according to claim 1, 2, or 3, wherein the cladding assembly comprises: top and bottom sheets, which are two sheets of the base material or one sheet of the base material and one sheet of a false material; side frames; and one or more sheets of the cladding material each having a selected thickness surrounded by the top and bottom sheets and side frames, characterized in that said side frames are provided with projections having a thickness equal to the total thickness of one or more sheets of the cladding material, said projections being clamped between said top and bottom sheets, one of said top and bottom sheets is secured to said side frames by welds, and an exposed surface of the cladding assembly uncovered by the other of the top and bottom sheets is cleaned.

6. A method according to claim 1, 2, or 3, wherein the cladding assembly comprises: top and bottom sheets defining an interior of the cladding assembly, which are two sheets of the base material or one sheet of the base material and one sheet of a false material; side frames; and one or more sheets of the cladding material surrounded by the top and bottom sheets and side frames, characterized in that said side frames are provided with projections having a thickness equal to the total thickness of the one or more sheets of the cladding material, said projections being clamping between said top and bottom sheets, one of said top and bottom sheets is secured to said side frames by welds, an exposed surface of the cladding assembly uncovered by the other of the top and bottom sheets is cleaned, the other of the top and bottom sheets is mounted to cover said exposed surface, an inert gas is blown into the cladding assembly until a positive pressure is established in the interior of the cladding assembly, and said other sheet is welded to the side frames under a condition of said positive pressure.

* * * * *

UNITED STATES PATENT AND TRADEMARK OFFICE
CERTIFICATE OF CORRECTION

PATENT NO. : 4,638,939

DATED : January 27, 1987

INVENTOR(S) : S. Yoshiwara, et al.

It is certified that error appears in the above-identified patent and that said Letters Patent is hereby corrected as shown below:

ABSTRACT, line 1, between "by" and "rolling" insert --means of--.

Column 1, line 40, change "field" to --yield--.

Column 2, line 50, change "shows" to --show--.

Column 3, line 16, change "free from cladding assembly by trouble" to --free from problems with the cladding assembly--.

Column 3, line 31, change "pressure-forming the surfaces" to --pressure-forming of the surfaces--.

Column 3, line 40, change "susceptable" to --susceptible--.

UNITED STATES PATENT AND TRADEMARK OFFICE
CERTIFICATE OF CORRECTION

PATENT NO. : 4,638,939

DATED : January 27, 1987

INVENTOR(S) : S. Yoshiwara, et al.

It is certified that error appears in the above-identified patent and that said Letters Patent is hereby corrected as shown below:

Column 6, line 23, change "limited" to --limit--.

Signed and Sealed this

Second Day of February, 1988

Attest:

DONALD J. QUIGG

*Attesting Officer*    *Commissioner of Patents and Trademarks*